(12) United States Patent
Ochadlick

(10) Patent No.: US 8,327,838 B1
(45) Date of Patent: Dec. 11, 2012

(54) SOLAR PARABOLIC TROUGH MIRROR/RECEIVER ALIGNMENT

(75) Inventor: Andrew R. Ochadlick, New Hope, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 754 days.

(21) Appl. No.: 12/252,866

(22) Filed: Oct. 16, 2008

(51) Int. Cl.
*F24J 2/40* (2006.01)
(52) U.S. Cl. ........ 126/572; 126/569; 126/573; 126/574; 126/600; 126/601
(58) Field of Classification Search ........... 126/569, 126/572, 573, 574, 600, 601, 608; 356/138, 356/139.01, 399, 400; 250/203.4; 73/865.9
See application file for complete search history.

(56) References Cited

U.S. PATENT DOCUMENTS

| | | | | |
|---|---|---|---|---|
| 4,203,426 | A * | 5/1980 | Matlock et al. | 126/605 |
| 4,219,729 | A * | 8/1980 | Smith | 250/203.4 |
| 4,758,838 | A * | 7/1988 | Maeda et al. | 342/25 D |
| 4,807,592 | A | 2/1989 | Trihey | |
| 4,821,705 | A | 4/1989 | Trihey | |
| 5,148,012 | A | 9/1992 | Carter | |
| 5,851,309 | A | 12/1998 | Kousa | |
| 5,861,947 | A * | 1/1999 | Neumann | 356/216 |
| 7,109,461 | B2 | 9/2006 | Lasich | |
| 7,667,833 | B1 * | 2/2010 | Diver | 356/138 |
| 2007/0251569 | A1 | 11/2007 | Shan et al. | |

OTHER PUBLICATIONS

Riffelmann, Neumann, and Ulmer; Performance enhancement of parabolic trough collectors by solar flux measurement in the focal region; Available online Oct. 3, 2005; Elsevier Ltd.; pp. 1303-1313.*
Diver and Moss; Practical Field Alignment of Parabolic Trough Solar Concentrators; May 2007; Journal of Solar Energy Engineering; Published by ASME; vol. 129 No. 2; pp. 153-159.*
Jorgensen, Burkholder, Gray, and Wendelin; Asses the Efficacy of an Aerial Distant Observer Tool Capable of Rapid Analysis of Large Sections of Collector Fields; Sep. 2008; National Renewable Energy Laboratory; pp. iii-61.*
Sandia National Laboratories, "Sandia Invention to Make Parabolic Trough Solar Collector Systems More Energy Efficient;" News Release (May 15, 2007).

* cited by examiner

*Primary Examiner* — Alfred Basichas
(74) *Attorney, Agent, or Firm* — Howard IP Law Group, PC

(57) ABSTRACT

The alignment of a parabolic trough reflector and its receiver pipe in a solar thermal field for collecting sunlight energy can be verified by acquiring an aerial image of the parabolic trough reflector from above the thermal field while passing through the sun-receiver-vertices plane of the parabolic trough reflector. By analyzing the aerial image to determine whether any reflection of the sun is visible in the parabolic trough reflector in the aerial image, one can determine whether the parabolic trough reflector and its receiver pipe is properly aligned. If a reflection of the sun is visible in the parabolic trough reflector in the aerial image, the parabolic trough reflector and its receiver pipe are out of alignment and require an adjustment.

10 Claims, 5 Drawing Sheets

SOLAR PARABOLIC TROUGH MIRROR/RECEIVER ALIGNMENT

CROSS-REFERENCE TO RELATED APPLICATION

None

FIELD OF THE INVENTION

This disclosure relates to solar energy collector systems.

BACKGROUND

Trough solar energy collector systems use parabolic trough-shaped reflectors to focus the sun light energy onto a receiver pipe running at the focus of each of the parabolic trough reflectors. Because of their parabolic shape, the trough reflectors can focus the sun's light energy at 30-70 times or greater than its normal intensity on the receiver pipe. The concentrated energy heats a heat transfer fluid, usually oil, flowing through the receiver pipe. This heated heat transfer fluid is then used to generate steam which powers turbines that drive electric generators. The reflectors are generally aligned on a north-south axis and the trough is rotated to follow and track the sun to maximize the sun's energy input to the receiver pipe.

The efficiency of the trough solar energy collector system is maximized when the parabolic trough reflector and the receiver pipe are aligned properly. If the parabolic trough reflector and the receiver pipe are not properly aligned, some of the sunlight will not be focused on the receiver pipe and wasted. Thus, in order to operate a solar thermal field at its optimum efficiency, the trough reflector/receiver pipe alignment must be properly maintained. Currently available parabolic trough reflector and receiver pipe technologies, however, can not maintain their alignment permanently and their alignment must be manually checked and adjusted periodically. Because a typical solar thermal field may comprise hundreds or even thousands of parabolic trough reflectors, maintaining the proper alignment between the parabolic trough reflectors and the receiver pipes poses significant challenges and cost to the operation of a solar thermal field.

SUMMARY

According to an embodiment of the disclosure, a method for verifying the alignment of a parabolic trough reflector and its receiver pipe in a solar thermal field for collecting sunlight energy is disclosed. First, an aerial image of the parabolic trough reflector is acquired from above the thermal field while passing through the sun-receiver-vertices plane of the parabolic trough reflector. Then, the aerial image is analyzed to determine whether any reflection of the sun is visible in the parabolic trough reflector in the aerial image. If a reflection of the sun is visible in the parabolic trough reflector in the aerial image, the parabolic trough reflector and its receiver pipe are out of alignment and require an adjustment.

According to another embodiment, a method for identifying out-of-alignment parabolic trough reflectors in an array of parabolic trough reflectors in a solar thermal field is disclosed. The array of parabolic trough reflectors comprises a plurality of rows of parabolic trough reflectors and each row of parabolic trough reflectors has a sun-receiver-vertices plane. First, a set of aerial images of the array of parabolic trough reflectors is acquired from above the thermal field. In the set of aerial images, each aerial image corresponds to each row of parabolic trough reflectors and each aerial image is taken from above the thermal field while passing through the sun-receiver-vertices plane of each row of parabolic trough reflectors. Next, the set of aerial images are analyzed to determine whether any reflection of the sun is visible in any of parabolic trough reflectors in the corresponding row of parabolic trough reflectors for a given aerial image. If a reflection of the sun is visible in a parabolic trough reflector in the set of aerial images, that particular parabolic trough reflector, in which the reflection of the sun is visible, and its receiver pipe are out of alignment.

BRIEF DESCRIPTION OF THE DRAWINGS

These and other features and advantages of the present invention will be more fully disclosed in the following detailed description of a preferred embodiment of the invention, which is to be considered together with the accompanying drawings.

The features shown in the above referenced drawings are illustrated schematically and are not intended to be drawn to scale nor are they intended to be shown in precise positional relationship. Like reference numbers indicate like elements.

DETAILED DESCRIPTION

Figure 1:
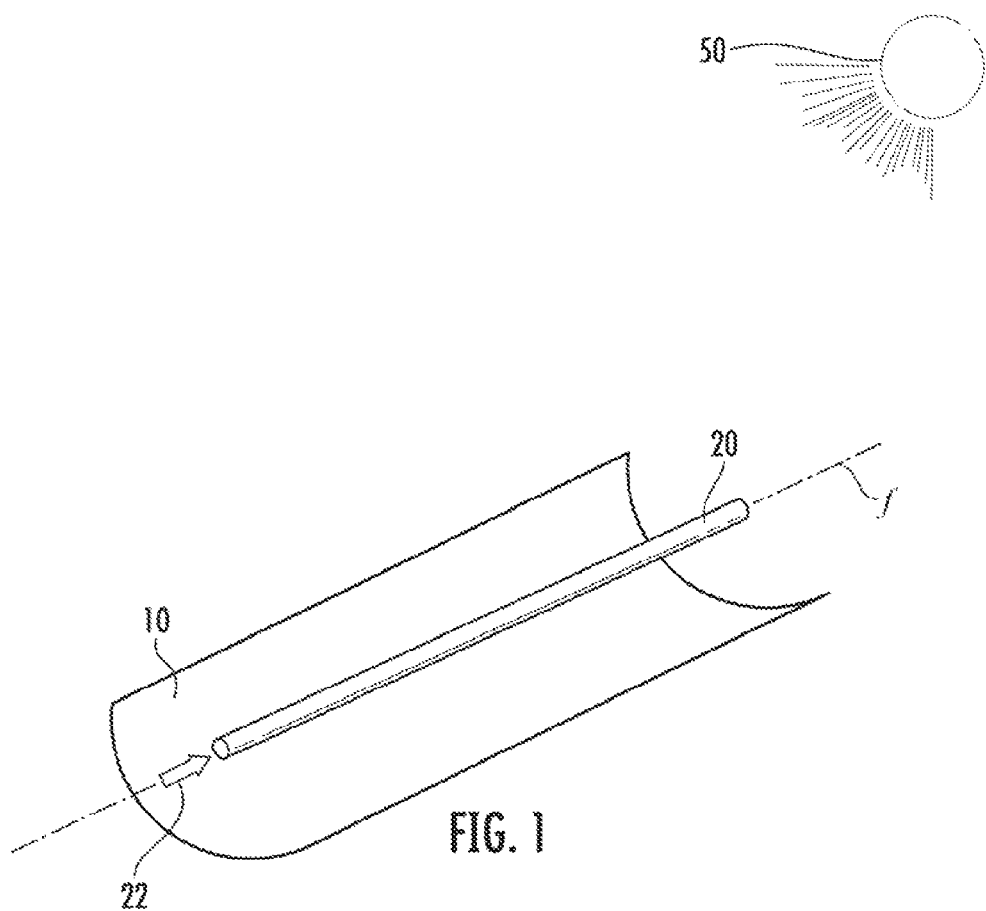
FIG. 1 is a perspective view of a parabolic trough reflector assembly.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, such as "attached," "attaching," "mounted," and "mounting" are used interchangeably and refer to one structure or surface being secured to another structure or surface, unless expressly described otherwise.

Referring to FIG. 1, an example of a trough reflector 10 for collecting and concentrating sunlight in a typical solar thermal field is illustrated. The trough reflector 10 is a reflective surface, such as a mirror, having a parabolic cross-section and a receiver pipe 20 is located at the focus line f of the parabolic trough 10. The parabolic trough reflector 10 and the receiver pipe 20 is configured such that the parabolic trough reflector 10 concentrates the incident sunlight from the sun 50 onto the receiver pipe 20. A heat transfer fluid, usually oil, represented by the arrow 22 flows through the receiver pipe 20 and is heated by the concentrated sunlight.

Figure 2:
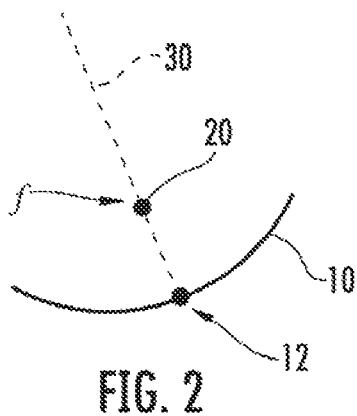
FIGS. 2 and 3 are end-view illustrations of a parabolic trough reflector and a receiver pipe.
Figure 3:
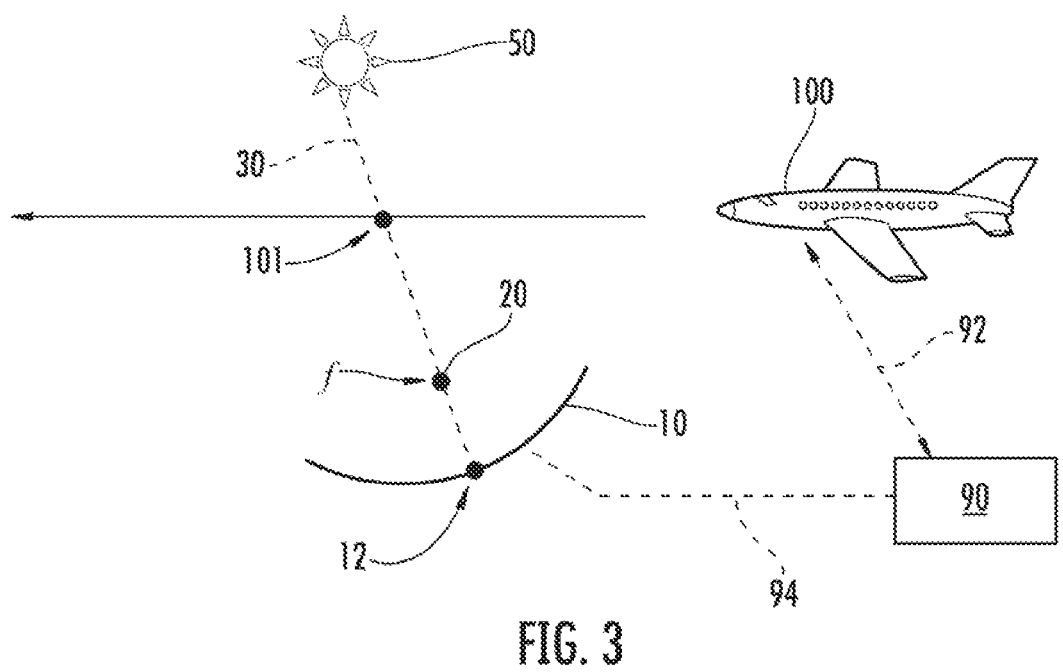
Figure 4:
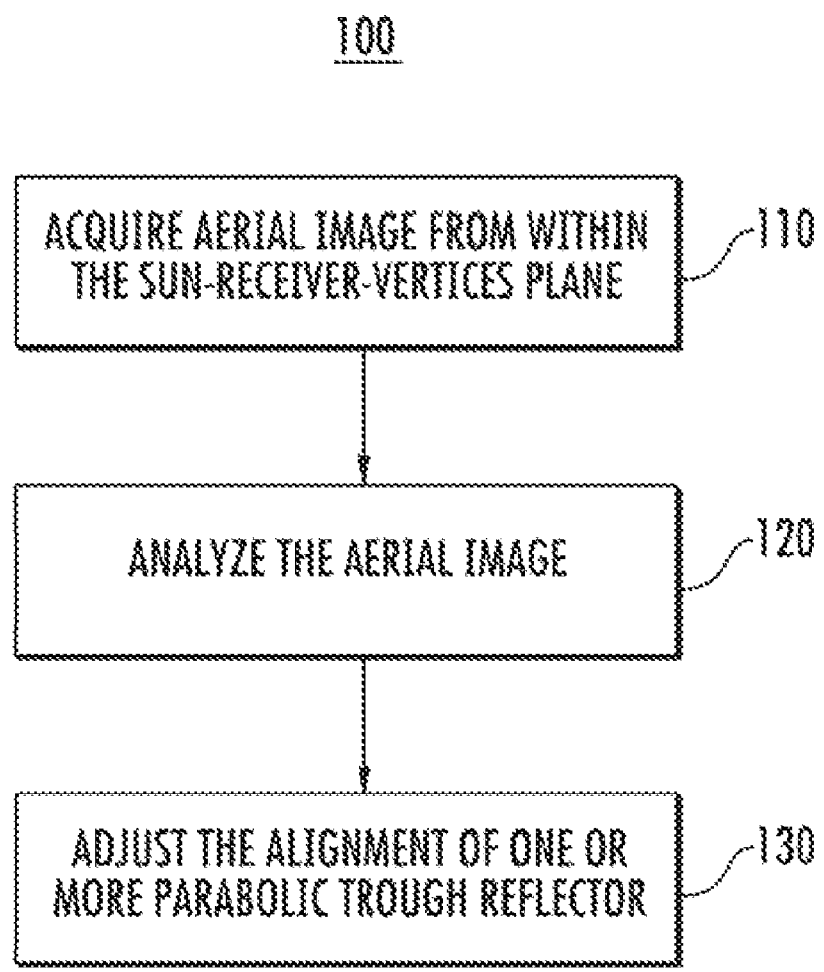
FIG. 4 is a flow chart illustrating a method according to an embodiment of the present disclosure.

FIGS. 2 and 3 are end-view illustrations of the parabolic trough reflector 10. A plane 30 contains the vertex 12 and the focus line f of the parabolic trough reflector 10. The optimal configuration of the parabolic trough reflector 10 and the receiver pipe 20 is to have the entire length of the receiver pipe 20 located at the focus line f of the parabolic trough reflector 10 and have the trough reflector 10 positioned so that the sun 50 lies in the plane 30 as shown in FIG. 3. For purposes of the discussion herein, the plane 30 will be referred to as the sun-receiver-vertices plane 30. This configuration assures that the maximum amount of sunlight incident upon the parabolic trough reflector 10 is concentrated onto the receiver pipe 20 because of the geometry of the parabolic trough.

In a typical solar thermal field containing an array of such parabolic trough reflectors 10, sophisticated sun tracking system is utilized to ensure that the parabolic trough reflectors 10 are always aimed at the sun 50 and track the sun 50 throughout the day to keep the sun 50 in the sun-receiver-vertices plane 30. Such sun tracking systems are well known in the solar thermal field industry and the details of such tracking system need not be described here. In FIG. 3, a solar thermal field control system 90 that controls the operation of the solar thermal field is schematically illustrated. The thermal solar field control system 90 is configured to control the operation of the parabolic trough reflectors 10 such as the sun tracking feature and the link 94 represents the communications and control signals between the control system 90 and the parabolic trough reflectors 10 necessary to enable the operation. The thermal field control system 90 would include appropriate processors such as one or more computer systems and the attendant supporting hardware and application codes necessary for such operation.

As discussed above, in addition to proper tracking of the sun, the alignment between the parabolic trough reflector 10 and the receiver pipe 20 is also important for the optimal operation of the solar collection assembly. The optimal operation requires that the receiver pipe 20 is located at the focus line f of the parabolic trough reflector 10.

According to an embodiment of the present disclosure, a method of evaluating whether the parabolic trough reflectors in an array of reflectors in a solar thermal field are in proper alignment is disclosed. The method requires acquiring at least one aerial image of the array of parabolic trough reflectors in a given solar thermal field. (See block 110). The aerial image is preferably taken from an aerial position that is in the sun-receiver-vertices plane 30. In other words, the aerial image is taken from a position 101 somewhere between the sun 50 and the focus line f of the parabolic trough reflector 10 as the imaging vehicle 100 carrying the camera is passing through the sun-receiver-vertices plane 30 as shown in FIG. 3. The imaging vehicle 100 can be an aircraft or a satellite.

In one example, a global positioning system (GPS) navigation on-board the imaging vehicle 100 can be used to determine that the aerial camera is in the sun-receiver-vertices plane 30 for a given parabolic trough (or a row of troughs). Since the celestial position of the sun 50 for a given geographical location can be determined by the timing information (time of day, day in the year), the sun's celestial position information can be used to aim the parabolic trough reflector 10 and track the sun 50. This, in turn, means that the position of the sun-receiver-vertices plane 30 for any given parabolic trough reflector 10 in the solar thermal field is known to the solar thermal field control system 90. Thus, if the altitude of the imaging vehicle 100 is known, the solar field control system NNN can determine the GPS coordinate of the point of intersection between the imaging vehicle 100's flight path and the sun-receiver-vertices plane 30 and transmit that information back to the imaging vehicle 100. Thus, the imaging vehicle 100 can use its on-board GPS navigation to take images of the solar thermal field with its on-board camera. A communications link 92 shown in FIG. 3 represents the appropriate communications link between the solar thermal field control system 90 and the imaging vehicle 100. The communications link 92 provides the means by which the control system 90 and the imaging vehicle 100 communicate and exchange data between them as described above. The imaging vehicle 100 comprises the camera (or other equivalent devices) required for acquiring the aerial image of the solar thermal field and the computer system (not shown) for performing the data processing and computational operations necessary to enable the method described herein, such as storing, transmitting, and/or performing image processing of the acquired aerial images.

The aerial image can be acquired in a conventional photographic format, a digital image format, or a synthetic aperture radar (SAR) format. In an embodiment where an SAR imaging is utilized, because SAR's radar signal functions as the illumination instead of the sunlight, the imaging analysis would involve processing the radar images. The position of the imaging vehicle 100 would remain the same, i.e., the SAR would be acquired as the imaging vehicle 100 is passing through the sun-receiver-vertices plane 30 so that the SAR transmitter/receiver is in the sun-receiver-vertices plane 30.

Figure 5A:
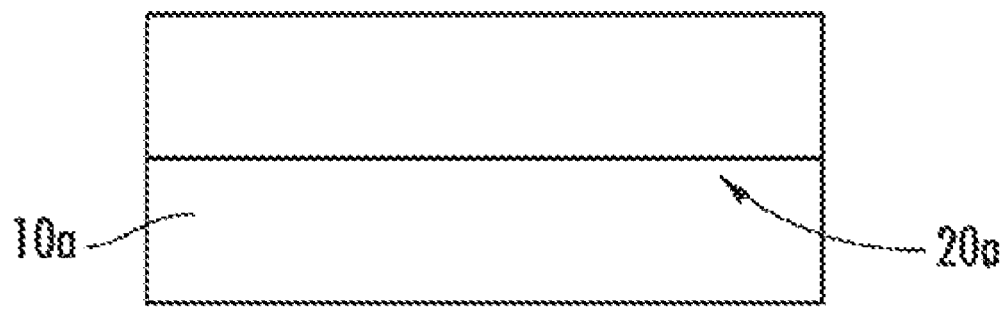
FIGS. 5a and 5b are examples of aerial views of a parabolic trough reflector according to an aspect of the present disclosure.

The aerial image data is then analyzed using an appropriate image analysis means to determine and identify parabolic trough reflectors in the solar thermal field that are out of alignment. (See block 120). The image analysis means may be a computer with appropriate image analysis application and can be located onboard the aircraft or at a remote location. FIG. 5a shows an example image of a parabolic trough reflector 10a, in which, the parabolic trough reflector 10a and the associated receiver pipe 20a are properly aligned. In a properly aligned parabolic trough reflector, the receiver pipe 20a is located at the focus line f of the parabolic trough reflector 10a along the pipe's full length, when viewed along the sun-receiver-vertices plane 30, all of the sunlight reflected by the parabolic trough reflector 10a should be captured by the receiver pipe 20a and only the reflection of the background sky should be visible through the parabolic trough reflector 10a.

Figure 5B:
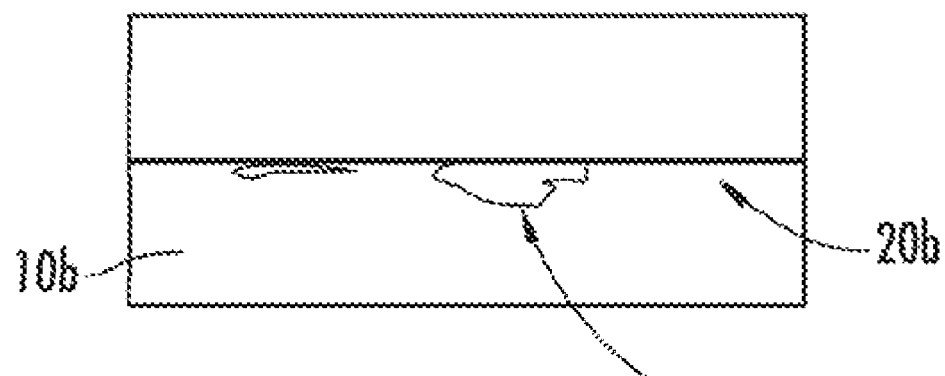

In contrast, FIG. 5b shows an example image of a parabolic trough reflector 10b, in which, the parabolic trough reflector 10b and the associated receiver pipe 20b are not properly aligned. In an improperly aligned parabolic trough reflector, all or a portion of the receiver pipe 20b is not located at the focus line f of the parabolic trough reflector 10b and not all of the reflected sunlight is focused on to the receiver pipe 20. In this image, some sunlight 55 leaks past the receiver pipe 20b. The presence of any leaking sunlight is an indication that the particular parabolic trough reflector requires alignment adjustment. The image analysis means is provided with an image analysis algorithm that can discern between the two types of images: one in alignment, and another not in alignment. If the resolution of the image is sufficiently high, the pattern of the leaking sunlight 55 can be used to determine how that particular parabolic trough reflector should be adjusted. Next, the parabolic trough reflectors that are identified from the image analysis step as requiring alignment adjustment are adjusted. (See block 130).

To facilitate an automated analysis of the aerial images, the aerial images may be acquired in a digital image format. A model of various levels of misalignment would be used to predict the pattern of sunlight (or radar in the embodiment using SAR imaging) leakage past the receiver during misalignment. The model would be adjusted to simulate the leakage observed in the acquired images. The parameters associated with the modeled pattern would provide the alignment solution information needed for the particular parabolic trough reflector and its receiver pipe. If the parabolic trough reflectors are appropriately configured with actuators etc. for automatic adjustment by the solar thermal field control system 90, the solar thermal field control system 90 can use the adjustment parameters to automatically adjust those parabolic trough reflectors that are in need of adjustment. Alternatively, the parabolic trough reflectors can be adjusted manually using the adjustment parameter information.

The analysis of the aerial images can be conducted using one of many image analysis tools and algorithms available in the image processing art. For example, edge detection algorithms which aim at identifying points in a digital image at which the image brightness changes sharply (also called discontinuities) can be used to analyze the aerial images of the parabolic trough reflectors to detect any sunlight leakage. Such edge detection image analysis algorithms are available from such commercially available numerical computing environments such as MATLAB and Mathematica. The image processing may be performed by the computer system on-board the imaging vehicle 100, the computer system provided in the solar thermal field control system 90, or by both computer systems if necessary.

Figure 6:
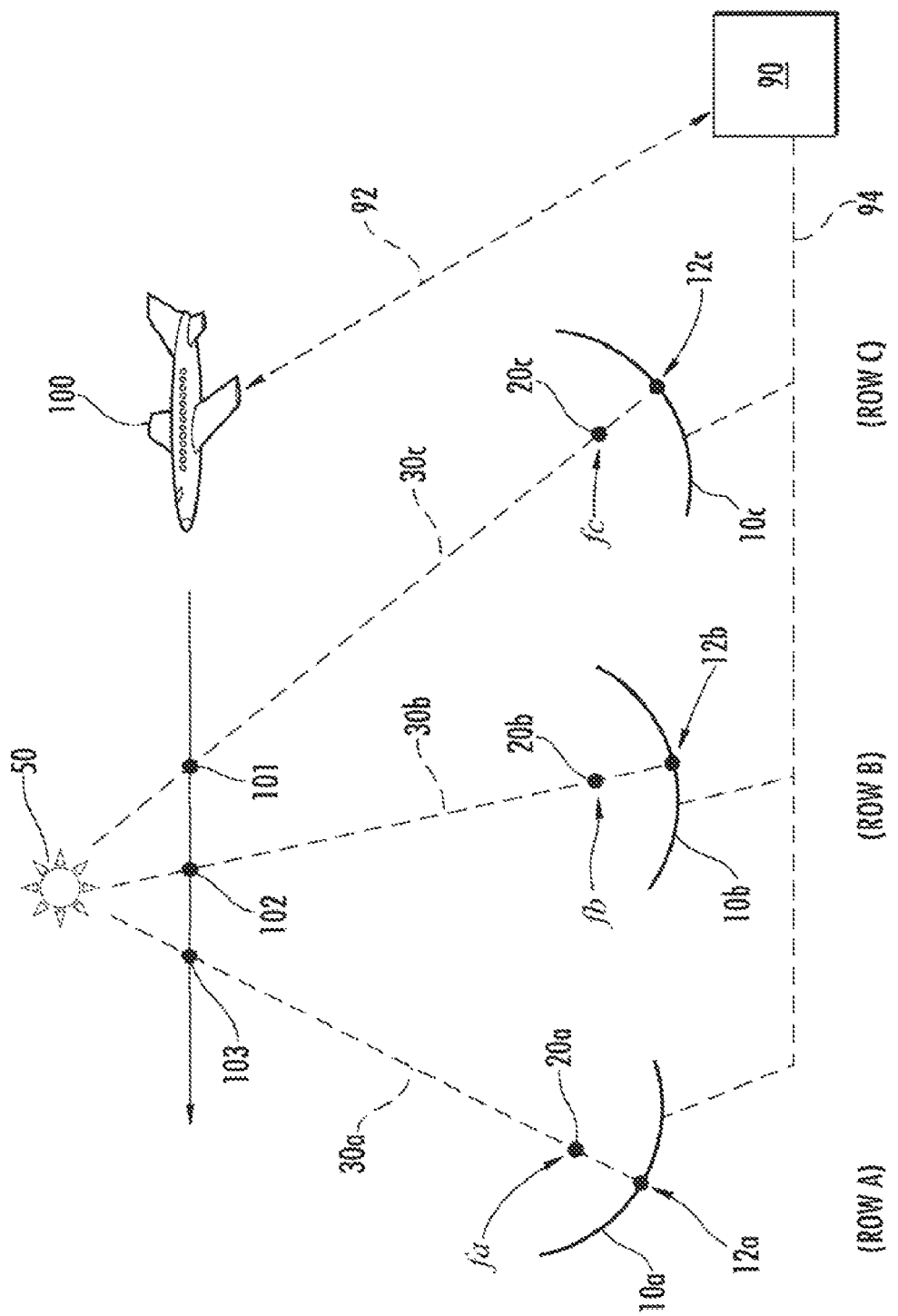
FIG. 6 is an end-view of three exemplary rows of parabolic trough reflectors in an array of parabolic trough reflectors in a solar thermal field.

As described above, because the aerial image of the parabolic trough reflector must be taken from an aerial position that is in the sun-receiver-vertices plane 30 of a given parabolic trough reflector 10, in a typical solar thermal field where hundreds or thousands of parabolic trough reflectors are provided in an array comprising a plurality of rows of parabolic trough reflectors, a multiple aerial images must be taken in order to cover all of the parabolic trough reflectors in the solar thermal field. Specifically, if the parabolic through reflectors in each of the rows in the array of parabolic trough reflectors are arranged with their focus line f aligned in a straight line and each of the parabolic trough reflectors have the same parabolic shape and dimension, all parabolic trough reflectors in a given row would share the same sun-receiver-vertices plane. Then, in order to implement the method of the present disclosure, at least one aerial image must be acquired for each of the rows in the array of parabolic trough reflectors in the solar thermal field. This is illustrated in FIG. 6. FIG. 6 shows an end-view of three rows A, B and C of parabolic trough reflectors 10a, 10b, 10c. Each of the row of parabolic trough reflectors have associated vertices 12a, 12b, 12c and the associated receiver pipes 20a, 20b, 20c located at their respective focus lines fa, fb, fc. The vertices, 12a, 12b, 12c, the focus lines fa, fb, fc and the sun 50 define the respective sun-receiver-vertices planes 30a, 30b, 30c for each of the reflector rows A, B, C. As a plane 100 equipped with a camera for acquiring the aerial images flies over the solar thermal field, at least one aerial image is taken at each of the aerial positions 101, 102 and 103. Each aerial position 101, 102, 103 representing the positions where the plane 100 is passing through the sun-receiver-vertices planes 30c, 30b, and 30a, respectively. Then by analyzing the aerial images taken at each of the aerial positions 101, 102, 103, the alignment of the parabolic trough reflectors in each of the rows A, B, and C can be verified.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for verifying alignment of a parabolic trough reflector and its receiver pipe in a solar thermal field for collecting sunlight energy, the parabolic trough reflector having a sun-receiver-vertices plane, the method comprising:
   acquiring an aerial image of the parabolic trough reflector from above the thermal field while passing through the sun-receiver-vertices plane of the parabolic trough reflector;
   analyzing the aerial image and determining whether any reflection of sunlight leaking past the receiver pipe is visible in the parabolic trough reflector in the aerial image, whereby a presence of a visible reflection of sunlight leaking past the receiver pipe in the parabolic trough reflector in the aerial image denotes that the parabolic trough reflector and its receiver pipe are out of alignment; and
   adjusting the alignment of the parabolic trough reflector and its receiver pipe when a determination is made that the parabolic trough reflector and its receiver pipe are out of alignment.

2. The method of claim 1, wherein the aerial image is a photographic image.

3. The method of claim 1, wherein the aerial image is a synthetic aperture radar image.

4. The method of claim 1, further comprising:
   determining an adjustment solution for the parabolic trough reflector and its receiver pipe when a determination is made that the parabolic trough reflector and its receiver pipe are out of alignment and the step of adjusting the parabolic trough reflector and its receiver pipe is conducted adjusted according to the adjustment solution.

5. A method for identifying out-of-alignment parabolic trough reflectors in an array of parabolic trough reflectors in a solar thermal field, said array of parabolic trough reflectors comprising a plurality of rows of parabolic trough reflectors and each row of parabolic trough reflectors having a sun-receiver-vertices plane, the method comprising:
   acquiring a set of aerial images of the array of parabolic trough reflectors, wherein each aerial image corresponds to each row of parabolic trough reflectors and each aerial image is taken from above the thermal field while passing through the sun-receiver-vertices plane of each row of parabolic trough reflectors;
   analyzing the aerial images and determining whether any reflection of sunlight leaking past a receiver pipe of an associated parabolic trough reflector is visible in any of the parabolic trough reflectors in the corresponding row of parabolic trough reflectors for a given aerial image, whereby a presence of a visible reflection of sunlight leaking past the receiver pipe in a parabolic trough reflector in the aerial images denotes that the parabolic trough reflector and its receiver pipe are out of alignment; and
   adjusting the alignment of those parabolic trough reflectors and their receiver pipes that have been determined to be out of alignment.

6. The method of claim 5, wherein the aerial image is a photographic image.

7. The method of claim 5, wherein the aerial image is a synthetic aperture radar image.

8. The method of claim 5, further comprising:
   determining an adjustment solution for each of the parabolic trough reflector and its receiver pipe that has been determined to be out of alignment and the step of adjusting the parabolic trough reflector and its receiver pipe is conducted according to the adjustment solution.

9. A system for verifying alignment of a parabolic trough reflector and its receiver pipe in a solar thermal field for collecting sunlight energy, the parabolic trough reflector having a sun-receiver-vertices plane, the system comprising:
   a vehicle configured for acquiring an aerial image of the parabolic trough reflector from above the thermal field while passing through the sun-receiver-vertices plane of the parabolic trough reflector; and
   a computer system configured for analyzing the aerial image and determining whether any reflection of sunlight leaking past the receiver pipe is visible in the parabolic trough reflector in the aerial image, whereby a presence of a visible reflection of sunlight leaking past the receiver pipe in the parabolic trough reflector in the aerial image denotes that the parabolic trough reflector and its receiver pipe are out of alignment, wherein the computer system is in communication link with the vehicle.

10. A system for identifying out-of-alignment parabolic trough reflectors in an array of parabolic trough reflectors in a solar thermal field, said array of parabolic trough reflectors comprising a plurality of rows of parabolic trough reflectors and each row of parabolic trough reflectors having a sun-receiver-vertices plane, the system comprising:
   a vehicle configured for acquiring a set of aerial images of the array of parabolic trough reflectors, wherein each aerial image corresponds to each row of parabolic trough reflectors and each aerial image is taken from above the thermal field while passing through the sun-receiver-vertices plane of each row of parabolic trough reflectors; and
   a computer system configured for analyzing the aerial images and determining whether any reflection of sunlight leaking past a receiver pipe of an associated parabolic trough reflector is visible in any of parabolic trough reflectors in the corresponding row of parabolic trough reflectors for a given aerial image, whereby a presence of a visible reflection of sunlight leaking past the receiver pipe in a parabolic trough reflector in the aerial images denotes that the parabolic trough reflector and its receiver pipe are out of alignment, wherein the computer system is in communication link with the vehicle.

* * * * *

UNITED STATES PATENT AND TRADEMARK OFFICE
CERTIFICATE OF CORRECTION

PATENT NO. : 8,327,838 B1
APPLICATION NO. : 12/252866
DATED : December 11, 2012
INVENTOR(S) : Andrew R. Ochadlick Page 1 of 1

It is certified that error appears in the above-identified patent and that said Letters Patent is hereby corrected as shown below:

Column 6, Line 33, Claim 4, the word "adjusted" should be removed.

Signed and Sealed this
Twenty-ninth Day of January, 2013

David J. Kappos
*Director of the United States Patent and Trademark Office*